United States Patent
Clark

(10) Patent No.: US 9,169,045 B2
(45) Date of Patent: Oct. 27, 2015

(54) GAS TURBINE ENGINE BLADE CONTAINMENT ARRANGEMENT

(75) Inventor: Daniel N. S. Clark, Derby (GB)

(73) Assignee: ROLLS-ROYCE plc, London (GB)

( * ) Notice: Subject to any disclaimer, the term of this patent is extended or adjusted under 35 U.S.C. 154(b) by 563 days.

(21) Appl. No.: 13/290,538

(22) Filed: Nov. 7, 2011

(65) Prior Publication Data

US 2012/0134774 A1    May 31, 2012

(30) Foreign Application Priority Data

Nov. 29, 2010   (GB) .................................. 1020143.2

(51) Int. Cl.
| | |
|---|---|
| *F01D 21/00* | (2006.01) |
| *F01D 21/04* | (2006.01) |
| *F01D 25/24* | (2006.01) |
| *B65D 43/02* | (2006.01) |
| *B65D 51/14* | (2006.01) |

(52) U.S. Cl.
CPC ............ *B65D 43/0222* (2013.01); *B65D 51/14* (2013.01); *B65D 2543/00092* (2013.01); *B65D 2543/00277* (2013.01); *B65D 2543/00527* (2013.01); *B65D 2543/00537* (2013.01); *B65D 2543/00972* (2013.01)

(58) Field of Classification Search
CPC ...... F01D 21/045; F01D 25/243; F01D 25/24
USPC ........................................ 415/9, 197, 200, 220
See application file for complete search history.

(56) References Cited

U.S. PATENT DOCUMENTS

| | | | | |
|---|---|---|---|---|
| 4,534,698 | A | * | 8/1985 | Tomich ............................ 415/9 |
| 4,648,795 | A |   | 3/1987 | Lardellier |
| 5,113,582 | A | * | 5/1992 | Monson et al. .............. 29/889.2 |
| 5,160,248 | A | * | 11/1992 | Clarke .............................. 415/9 |
| 5,447,411 | A |   | 9/1995 | Curley et al. |
| 5,485,723 | A |   | 1/1996 | McCoy et al. |
| 6,071,077 | A | * | 6/2000 | Rowlands ................. 416/223 A |
| 6,179,551 | B1 |   | 1/2001 | Sathianathan et al. |
| 6,206,631 | B1 |   | 3/2001 | Schilling |
| 6,251,494 | B1 |   | 6/2001 | Schreiber |

(Continued)

FOREIGN PATENT DOCUMENTS

| | | |
|---|---|---|
| EP | 0 795 682 A1 | 9/1997 |
| EP | 0 965 731 A2 | 12/1999 |

(Continued)

OTHER PUBLICATIONS

British Search Report issued in British Application No. GB1020143.2 dated Mar. 22, 2011.

*Primary Examiner* — Craig Kim
*Assistant Examiner* — Brian P Wolcott
(74) *Attorney, Agent, or Firm* — Oliff PLC

(57) ABSTRACT

A gas turbine engine blade containment arrangement comprises a casing, a first layer of cellular material arranged within the casing, a septum layer within the first layer of cellular material, a second layer of cellular material within the septum layer, a strong and ductile layer within the second layer of cellular material and a layer of abradable material within the strong and ductile layer.

29 Claims, 2 Drawing Sheets

(56) References Cited

U.S. PATENT DOCUMENTS

| | | |
|---|---|---|
| 6,468,026 B1 | 10/2002 | Bonnoitt et al. |
| 6,619,913 B2 * | 9/2003 | Czachor et al. ............... 415/119 |
| 6,652,222 B1 * | 11/2003 | Wojtyczka et al. ............... 415/9 |
| 6,769,864 B2 * | 8/2004 | Sathianathan et al. ............ 415/9 |
| 7,390,161 B2 * | 6/2008 | Xie et al. ......................... 415/9 |
| 7,402,022 B2 * | 7/2008 | Harper et al. ..................... 415/9 |
| 2004/0141837 A1 | 7/2004 | McMillan et al. |
| 2009/0155044 A1 * | 6/2009 | Xie et al. ......................... 415/9 |

FOREIGN PATENT DOCUMENTS

| | | |
|---|---|---|
| EP | 1 245 791 A2 | 10/2002 |
| EP | 1 336 739 A3 | 8/2003 |
| EP | 1 857 655 A2 | 11/2007 |
| EP | 2 071 137 A2 | 6/2009 |
| EP | 2 096 269 A2 | 9/2009 |
| GB | 2 356 669 A | 5/2001 |
| GB | 2 427 436 A | 12/2006 |
| GB | 2 459 844 A | 11/2009 |

* cited by examiner

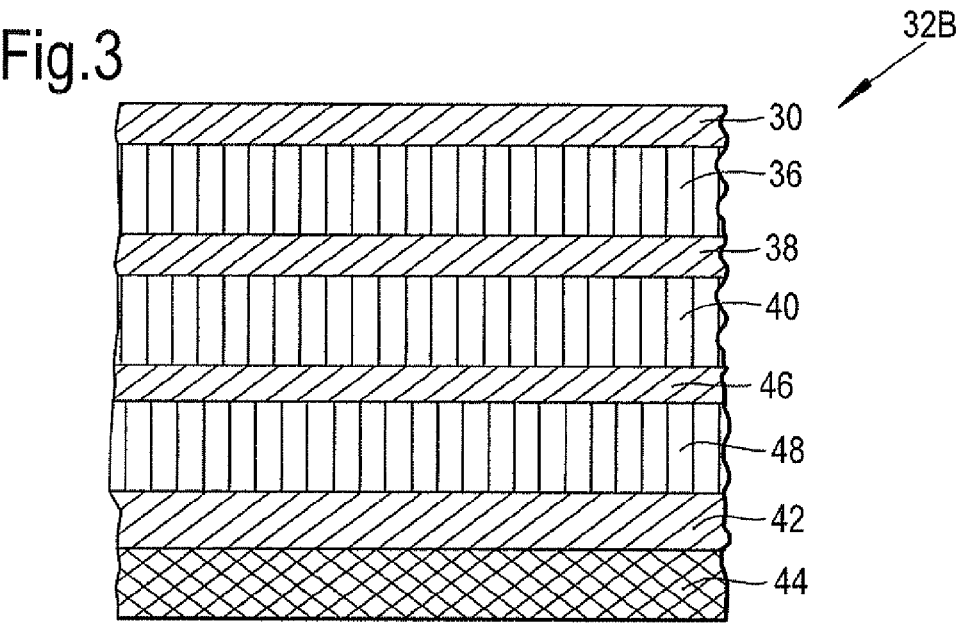
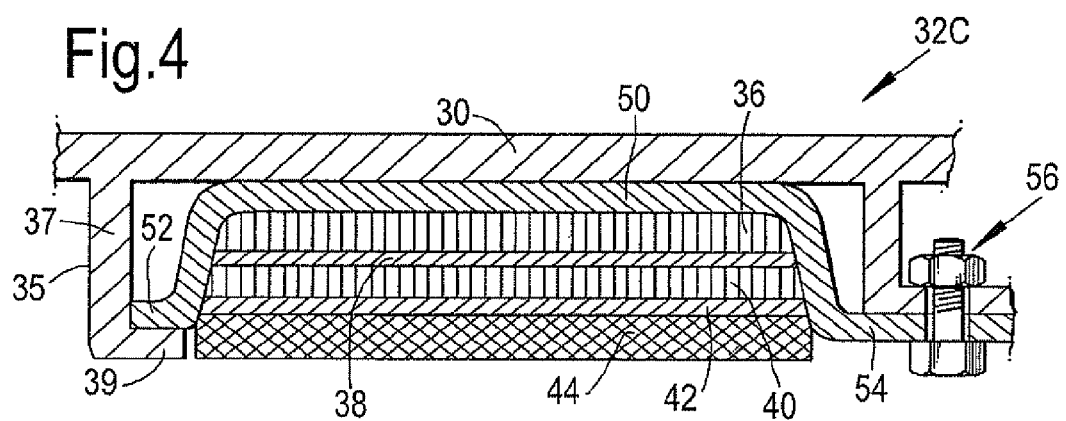
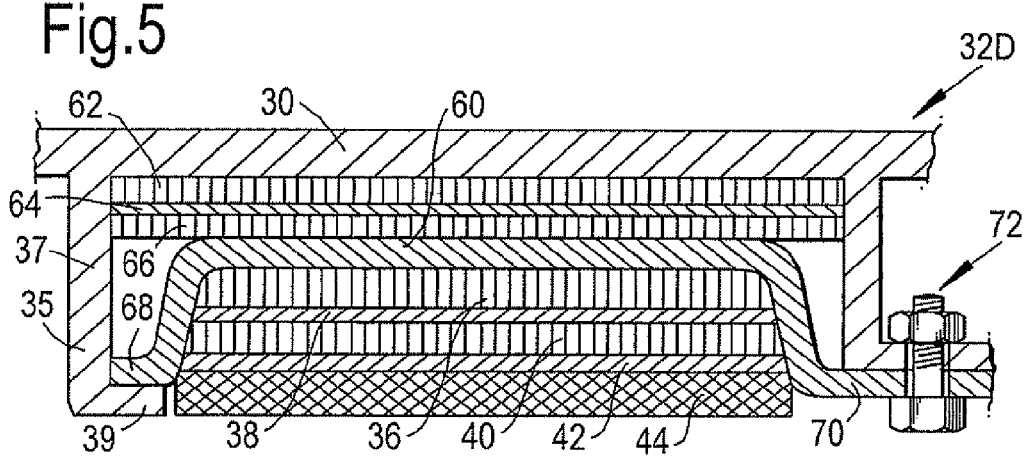

GAS TURBINE ENGINE BLADE CONTAINMENT ARRANGEMENT

The present invention relates to a gas turbine engine blade containment arrangement, particularly to a turbofan gas turbine engine blade containment arrangement.

Turbofan gas turbine engines comprise a fan rotor which includes a fan disc carrying a plurality of circumferentially spaced radially extending fan blades. Foreign objects, such as birds and other objects are occasionally ingested into the intake of the gas turbine engine with the working fluid drawn into the gas turbine engine. These foreign objects may strike and damage a fan blade to such an extent that the fan blade fails in the root region of the fan blade where it is secured to the fan disc. The fan blade may also fail in the root region due to other causes. During such a failure of the of the fan blade it is flung radially outwardly from the fan disc with considerable energy.

Turbofan gas turbine engines are provided with blade containment arrangements to contain a detached fan blade, or a part of a detached fan blade, in the event of a failure of a fan blade.

The blade containment arrangements generally comprise metallic fan casings with thicker regions to contain a detached fan blade or relatively thin metallic fan casings which allow a detached fan blade to pass through the fan casing and a plurality of layers of fibrous material wound around the outer surface of the fan casing to contain the detached fan blade. Other blade containment arrangements comprise metallic fan casings which have one or more reinforcing ribs extending radially outwardly and circumferentially from the fan casing. These blade containment arrangements generally comprise a fan track liner radially within the fan casing and spaced radially from and around the fan rotor. The fan track liner includes a honeycomb layer radially within the fan casing, a septum layer within the honeycomb layer and an abradable layer within the septum layer.

Fan rotors with swept fan blades are contemplated and this results in ice impacts from ice detached from the swept fan blades impacting upon the fan casing further upstream than with conventional fan blades. Therefore the fan blade containment arrangement must fulfil three purposes. The fan blade containment arrangement must be strong enough to withstand ice impacts, the fan blade containment arrangement must be abradable to accommodate variation in radial position, variation in rotation and vibrations and the fan blade containment arrangement must not effect the trajectory of a detached fan blade during a fan blade off event.

Accordingly the present invention seeks to provide a novel gas turbine engine blade containment arrangement which reduces, or overcomes, the above mentioned problems.

Accordingly the present invention provides a gas turbine engine blade containment arrangement comprising a casing, a first layer of cellular material arranged within the casing, a septum layer within the first layer of cellular material, a second layer of cellular material within the septum layer, a strong and ductile layer within the second layer of cellular material and a layer of abradable material within the strong and ductile layer, the strong and ductile layer having a higher yield stress than the layer of abradable material, the strong and ductile layer having ductility which is greater than the crush initiation limit of the layers of cellular material and the strong and ductile layer being arranged to contain at least a portion of a detached blade.

The first layer of cellular material may comprise a layer of honeycomb, a layer of a closed cell foam or a layer of an open cell foam. The second layer of cellular material may comprise a layer of honeycomb, a layer of a closed cell foam or a layer of an open cell foam.

The strong and ductile layer may comprise chopped fibres in a resin. The strong and ductile layer may comprise chopped glass fibres.

The honeycomb may comprise an aluminium honeycomb. The aluminium honeycomb in the first layer of cellular material may have a dimension of 6.35 mm between the walls of the cells and the walls of the cells may have a thickness of 0.06 mm. The aluminium honeycomb in the second layer of cellular material may have a dimension of 6.35 mm between the walls of the cells and the walls of the cells have a thickness of 0.1 mm.

The septum layer may comprise a composite material, e.g. graphite reinforced plastic.

The blade containment arrangement may comprise a second septum layer within the second layer of cellular material, a third layer of cellular material within the second septum layer, the strong and ductile layer within the third layer of cellular material and the layer of abradable material within the strong and ductile layer. The third layer of cellular material may comprise a layer of honeycomb, a layer of a closed cell foam or a layer of an open cell foam.

The honeycomb may comprise an aluminium honeycomb.

All the layers may be arranged in a cassette and the cassette is secured to the casing.

The cassette may comprise a composite material, e.g. graphite reinforced plastic.

A further layer of cellular material may be arranged between the casing and the cassette. A further septum layer may be arranged between the further layer of cellular material and the cassette and an additional layer of cellular material is arranged between the further septum layer and the cassette.

The first layer of cellular material may be weaker than the second layer of cellular material. The second layer of cellular material may be weaker than the third layer of cellular material.

The further layer of cellular material may be weaker than the additional layer of cellular material.

The gas turbine engine may be a turbofan gas turbine engine and the casing is a fan casing.

The present invention will be more fully described by way of example with reference to the accompanying drawings, in which:—

FIG. 3 is an enlarged cross-section through a further blade containment arrangement according to the present invention.

FIG. 4 is an enlarged cross-section through another blade containment arrangement according to the present invention.

FIG. 5 is an enlarged cross-section through an additional blade containment arrangement according to the present invention.

Figure 1:
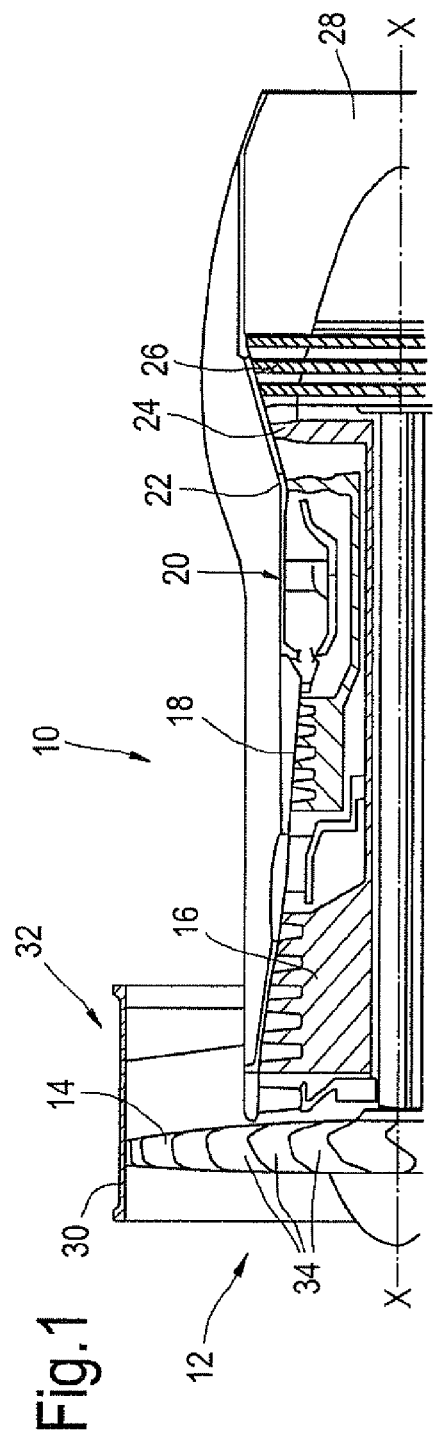
FIG. 1 is a cross-section through a turbofan gas turbine engine having a blade containment arrangement according to the present invention.

A turbofan gas turbine engine 10, as shown in FIG. 1, comprises in axial flow series an intake 12, a fan 14, an intermediate pressure compressor 16, a high pressure compressor 18, a combustor 20, a high pressure turbine 22, an intermediate pressure turbine 24, a low pressure turbine 26 and an exhaust 28. The fan 14 is surrounded by a fan casing 30 and a blade containment arrangement 32 is provided to contain a detached fan blade if a fan blade 34 should fail for any reason.

Figure 2:
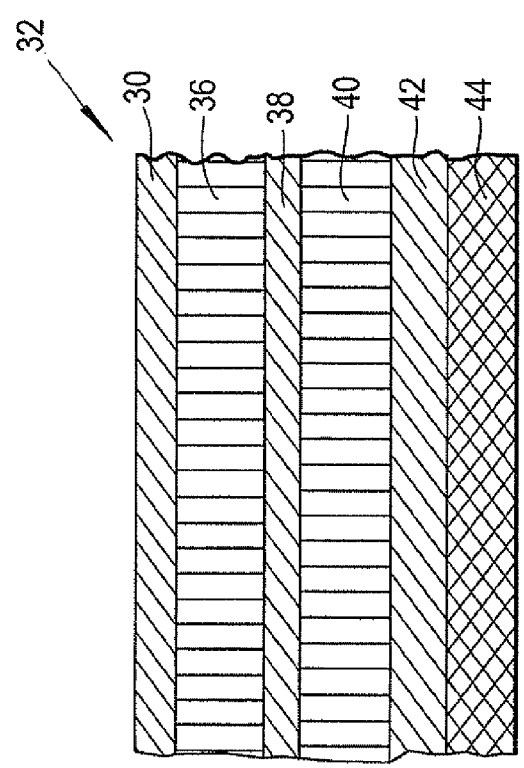
FIG. 2 is an enlarged cross-section through a blade containment arrangement according to the present invention.

The blade containment arrangement 32 is shown more clearly in FIG. 2, and comprises the fan casing 30, a first layer of cellular material 36 arranged within the fan casing 30, a septum layer 38 is arranged within the first layer of cellular material 36, a second layer of cellular material 40 is arranged within the septum layer 38, a strong and ductile layer 42 is arranged within the second layer of cellular material 40 and a layer of abradable material 44 is arranged within the strong and ductile layer 42. The first layer of cellular material 36 is secured, e.g. bonded, to the radially inner surface of the fan casing 30 and each layer is bonded to the adjacent layer or layers.

The first layer of cellular material 36 comprises a layer of honeycomb, a layer of a closed cell foam or a layer of an open cell foam. The open cell foam and/or the closed cell foam may be a metal foam. The second layer of cellular material 40 comprises a layer of honeycomb, a layer of a closed cell foam or a layer of an open cell foam. The open cell foam and/or the closed cell foam may be a metal foam. The strong and ductile layer 42 comprises chopped fibres in a resin and in particular the strong and ductile layer 42 comprises chopped glass fibres.

The honeycomb may comprise an aluminium honeycomb. The aluminium honeycomb in the first layer of cellular material 36 has a dimension of 6.35 mm between the walls of the cells and the walls of the cells may have a thickness of 0.06 mm. The aluminium honeycomb in the second layer of cellular material 40 has a dimension of 6.35 mm between the walls of the cells and the walls of the cells have a thickness of 0.1 mm. The first layer of cellular material and the second layer of cellular material may have similar cell sizes. The first layer of cellular material and the second layer of cellular material may have similar radial thicknesses. However, it is preferred that the first layer of cellular material is weaker than the second layer of cellular material.

The septum layer 38 comprises a composite material, e.g. graphite reinforced plastic.

The fan casing 30 is cylindrical and/or frustoconical. The first layer of cellular material 36, the septum layer 38, the second layer of cellular material 40, the strong and ductile layer 42 and the layer of abradable material 44 are all annular and are arranged coaxially within the fan casing 30. The first layer of cellular material 36 may comprise a single panel or a plurality of circumferentially arranged panels arranged in end to end relationship. The second layer of cellular material 40 may comprise a single panel or a plurality of circumferentially arranged panels arranged in end to end relationship. The layer of abradable material 44 may comprise a single panel or a plurality of circumferentially arranged panels arranged in end to end relationship. The septum layer 38 comprises a single annular piece and the strong and ductile layer 42 comprises a single annular piece, but may be more than one.

The strong and ductile layer 42 is arranged between the layer of abradable material 44 and the layers of cellular material 36 and 40. The strong and ductile layer 42 is stiffer and has a higher yield stress than the layer of abradable material 44 but has a degree of ductility which is greater than the crush initiation limit of the layers of cellular material 36 and 40. The strong and ductile layer 42 contains a detached fan blade, or a portion of a detached fan blade, without rupturing when a detached fan blade impacts upon it and the strong and ductile layer 42 transmits the energy of the detached fan blade through to the second layer of cellular material 40, the septum layer 38 and the first layer of cellular material 36 which surround the strong and ductile layer 42. The first and second layers of cellular material 36 and 40 separated by the septum layer 38 absorb the energy of a detached fan blade. When a detached fan blade impacts the blade containment arrangement 32 and the layers of cellular material 36 and 40 are impacted at high rates of strain, the layers of cellular material 36 and/or 40 tend to start crushing locally at the face of the layer of cellular material 36 and/or 40. The provision of the first and second layers of cellular material 36 and 40 allows this local crushing of cellular material to occur twice and through the thickness of the blade containment arrangement 32 and enables more energy to be absorbed from a fan blade impact. The septum layer 38 acts as a disjoint between the first and second layer of cellular material 36 and 40 and allows the impact load to be spread across the layer of cellular material 36. In an impact the second layer of cellular material 40 is damaged and crushed locally first and then the impact load is spread by the septum layer 38 and the first layer of cellular material 36 is damaged and crushed over a greater area than the second layer of cellular material 40. Thus the first and second layers of cellular material 36 and 40, the septum layer 38 and the strong and ductile layer 42 enable fan blade containment arrangement 32 to absorb more energy from the fan blade impact and prevent the fan blade penetrating through the fan blade containment arrangement 32. The overall thickness of the fan blade containment arrangement 32 may be similar in thickness to current fan blade containment arrangements and acts independently of the fan casing. The fan blade containment arrangement of the present invention enables the weight of the fan casing to be reduced. The layers 36, 38, 40, 42 and 44 within the fan casing 30 act as a fan blade containment system independently of the fan casing 30 and thus the design of the fan casing 30 may not be determined solely by fan blade containment requirements. The layers 36, 38, 40, 42 and 44 within the fan casing 30 form a fan track liner which contains a detached fan blade enabling a reduction in weight of the fan casing. The fan track liner withstands impacts from ice detached from the swept fan blades and the fan track liner has an abradable layer.

A further blade containment arrangement 32B is shown more clearly in FIG. 3, and the blade containment arrangement 32B is similar to that shown in FIG. 2 and like parts are denoted by like numerals. The blade containment arrangement 32B differs in that it comprises a second septum layer 46 arranged within the second layer of cellular material 40, a third layer of cellular material 48 arranged within the second septum layer 46, the strong and ductile layer 42 arranged within the third layer of cellular material 48 and the layer of abradable material 44 arranged within the strong and ductile layer 42. The third layer of cellular material 48 may comprise a layer of honeycomb, a layer of a closed cell foam or a layer of an open cell foam. The open cell foam and/or the closed cell foam may be a metal foam. The honeycomb may comprise an aluminium honeycomb. The first layer of cellular material 36 is secured, e.g. bonded, to the radially inner surface of the fan casing 30 and each layer is bonded to the adjacent layer or layers.

The third layer of cellular material 48 may comprise a single panel or a plurality of circumferentially arranged panels arranged in end to end relationship. The second septum layer 46 comprises a single annular piece, but may be more than one. It is preferred that the first layer of cellular material is weaker than the second layer of cellular material and that the second layer of cellular material is weaker than the third layer of cellular material.

Another blade containment arrangement 32C is shown more clearly in FIG. 4, and the blade containment arrangement 32C is similar to that shown in FIG. 2 and like parts are denoted by like numerals. In the blade containment arrangement 32C the first layer of cellular material 36 is arranged within the fan casing 30, the septum layer 38 is arranged within the first layer of cellular material 36, the second layer of cellular material 40 is arranged within the septum layer 38, the strong and ductile layer 42 is arranged within the second layer of cellular material 40 and the layer of abradable material 44 is arranged within the strong and ductile layer 42. In addition all the layers are arranged in a cassette 50 and the cassette 50 is secured to the fan casing 30. Thus the cassette 50 is arranged within the fan casing 30 and the first layer of cellular material 36 is arranged within the cassette 50. The first layer of cellular material 36 is secured, e.g. bonded, to the cassette 50. The cassette 50 may comprise a composite material, e.g. graphite reinforced plastic. The fan casing 30 has a hook 35 which has a radially inwardly extending portion 37 and an axially downstream extending portion 39. The cassette 50 is positioned downstream of the hook 35 and is secured to the fan casing 30. In particular the cassette 50 may be bonded to the radially inner surface of the fan casing 30. Alternatively an axially upstream extending portion 52 of the cassette 50 may locate on the radially outwardly surface of the axially downstream extending portion 39 of the hook 35 and a downstream portion 54 of the cassette 50 may be secured to the fan casing 30 via fasteners 56. A further alternative is to bond the cassette 50 to the radially inner surface of the fan casing 30 and to locate an axially upstream extending portion 52 of the cassette 50 on the radially outwardly surface of the axially downstream extending portion 39 of the hook 35 and to secure a downstream portion 54 of the cassette 50 to the fan casing 30 via fasteners 56. The first layer of cellular material may be weaker than the second layer of cellular material.

An additional blade containment arrangement 32D is shown more clearly in FIG. 5, and the blade containment arrangement 32D is similar to that shown in FIG. 2 and like parts are denoted by like numerals. In the blade containment arrangement 32D the first layer of cellular material 36 is arranged within the fan casing 30, the septum layer 38 is arranged within the first layer of cellular material 36, the second layer of cellular material 40 is arranged within the septum layer 38, the strong and ductile layer 42 is arranged within the second layer of cellular material 40 and the layer of abradable material 44 is arranged within the strong and ductile layer 42. In addition all the layers are arranged in a cassette 60 and the cassette 60 is secured to the fan casing 30. Thus the cassette 60 is arranged within the fan casing 30 and the first layer of cellular material 36 is arranged within the cassette 60. The first layer of cellular material 36 is bonded to the cassette 60. The cassette 60 may comprise a composite material, e.g. graphite reinforced plastic. A further layer of cellular material 62 is arranged between the fan casing 30 and the cassette 60. A further septum layer 64 is arranged between the further layer of cellular material 62 and the cassette 60 and an additional layer of cellular material 66 is arranged between the further septum layer 64 and the cassette 60. The further layer of cellular material 62 may comprise a layer of honeycomb, a layer of a closed cell foam or a layer of an open cell foam. The open cell foam and/or the closed cell foam may be a metal foam. The honeycomb may comprise an aluminium honeycomb. The additional layer of cellular material 66 may comprise a layer of honeycomb, a layer of a closed cell foam or a layer of an open cell foam. The open cell foam and/or the closed cell foam may be a metal foam. The honeycomb may comprise an aluminium honeycomb. The further layer of cellular material 62 is bonded to the radially inner surface of the fan casing 30, the third septum layer 64 is bonded to the further layer of cellular material 62 and the additional layer of cellular material 66 is bonded to the third septum layer 64.

The further layer of cellular material 62 may comprise a single panel or a plurality of circumferentially arranged panels arranged in end to end relationship. The additional layer of cellular material 66 may comprise a single panel or a plurality of circumferentially arranged panels arranged in end to end relationship. The further septum layer 64 comprises a single annular piece, but may be more than one.

The fan casing 30 has a hook 35 which has a radially inwardly extending portion 37 and an axially downstream extending portion 39. The cassette 60 is positioned downstream of the hook 35 and is secured to the fan casing 30. In particular the cassette 60 may be bonded to the radially inner surface of the fan casing 30. Alternatively an axially upstream extending portion 68 of the cassette 60 may locate on the radially outwardly surface of the axially downstream extending portion 39 of the hook 35 and a downstream portion 70 of the cassette 60 may be secured to the fan casing 30 via fasteners 72. A further alternative is to bond the cassette 60 to the radially inner surface of the fan casing 30 and to locate an axially upstream extending portion 68 of the cassette 60 on the radially outwardly surface of the axially downstream extending portion 39 of the hook 35 and to secure a downstream portion 70 of the cassette 50 to the fan casing 30 via fasteners 72. The first layer of cellular material may be weaker than the second layer of cellular material and the further layer of cellular material may be weaker than the additional layer of cellular material.

Further embodiments of the present invention provide the arrangement of a first layer of cellular material 36, a septum layer 38 is arranged within the first layer of cellular material 36, a second layer of cellular material 40 is arranged within the septum layer 38, a second septum layer 46 arranged within the second layer of cellular material 38, a third layer of cellular material 48 arranged within the second septum layer 46, a strong and ductile layer 42 arranged within the third layer of cellular material 48 and a layer of abradable material 44 arranged within the strong and ductile layer 42 within the cassette 50 of FIG. 4 or the cassette of FIG. 5.

The cells in the layers of honeycomb may be arranged perpendicular to the fan casing, but the cells in the layers of honeycomb may be arranged at an angle to the fan casing in the direction of impact.

In all the embodiments of the present invention the strong and ductile layer is arranged to prevent a detached blade, or portion of a blade, penetrating there-through and into the adjacent layer of cellular material, either the second layer of cellular material or the third layer of cellular material. The strong and ductile layer must also be flexible enough to cope with the deflections produced during crushing of the layer, or layers, of cellular material. The strong an ductile layer may comprise other suitable composite materials comprising fibres in a resin.

The fan casing, or casing, may comprise a composite material comprising fibres in a matrix material, e.g. carbon and/or glass fibres in a resin matrix. The blade, or fan blade, may comprise a composite material.

Although the present invention has been described with reference to a turbofan gas turbine engine and a fan casing to contain a detached fan blade, it is equally applicable to other casings of a gas turbine engine to contain other detached blades, e.g. compressor casings to contain compressor blades or turbine casings to contain turbine blades.

The invention claimed is:
1. A turbofan gas turbine engine comprising a fan, a fan casing and a fan blade containment arrangement,
the fan comprising a fan rotor having a plurality of fan blades, the fan casing surrounding the fan rotor and fan blades,
the fan blade containment arrangement surrounding the fan rotor and fan blades, the fan blade containment arrangement being arranged radially between the fan casing and the fan, the fan blade containment arrangement being axially shorter than the fan casing, the fan blade containment arrangement comprising a first layer of cellular material radially within an inner surface of the fan casing, a septum layer radially within an inner surface of the first layer of cellular material, a second layer of cellular material radially within an inner surface of the septum layer, a ductile layer radially within an inner surface of the second layer of cellular material and a layer of abradable material radially within an inner surface of the ductile layer, the ductile layer being axially shorter than the fan casing, the ductile layer having a higher yield stress than the layer of abradable material, the ductile layer having ductility which is greater than a crush initiation limit of the first and second layers of cellular material and the ductile layer being arranged to contain at least a portion of a detached blade without rupturing.

2. A turbofan gas turbine engine as claimed in claim 1 wherein the first layer of cellular material comprises a layer of honeycomb, a layer of a closed cell foam or a layer of an open cell foam.

3. A turbofan gas turbine engine as claimed in claim 1 wherein the second layer of cellular material comprises a layer of honeycomb, a layer of a closed cell foam or a layer of an open cell foam.

4. A turbofan gas turbine engine as claimed in claim 1 wherein the ductile layer comprises chopped fibers in a resin.

5. A turbofan gas turbine engine as claimed in claim 4 wherein the ductile layer comprises chopped glass fibers.

6. A turbofan gas turbine engine as claimed in claim 2 wherein the honeycomb comprises an aluminum honeycomb.

7. A turbofan gas turbine engine as claimed in claim 6 wherein the aluminum honeycomb in the first layer of cellular material has a dimension of 6.35 mm between opposing walls of each cell of the honeycomb and the opposing walls of each cell has a thickness of 0.06 mm.

8. A turbofan gas turbine engine as claimed in claim 7 wherein the aluminum honeycomb in the second layer of cellular material has a dimension of 6.35 mm between opposing walls of each cell of the honeycomb and the opposing walls of each cell has a thickness of 0.1 mm.

9. A turbofan gas turbine engine as claimed in claim 1 wherein the septum layer comprises a composite material.

10. A turbofan gas turbine engine as claimed in claim 1 comprising a second septum layer within the second layer of cellular material, a third layer of cellular material within the second septum layer, the ductile layer within the third layer of cellular material and the layer of abradable material within the ductile layer.

11. A turbofan gas turbine engine as claimed in claim 10 wherein the third layer of cellular material comprises a layer of honeycomb, a layer of a closed cell foam or a layer of an open cell foam.

12. A turbofan gas turbine engine as claimed in claim 11 wherein the honeycomb comprises an aluminum honeycomb.

13. A turbofan gas turbine engine as claimed in claim 1 wherein the first and second layers of cellular material, the ductile layer, the septum layer and the layer of abradable material are arranged in a cassette, the cassette is arranged within the fan casing and the cassette is secured to the casing.

14. A turbofan gas turbine engine as claimed in claim 13 wherein the cassette comprises a composite material.

15. A turbofan gas turbine engine as claimed in claim 13 wherein an additional layer of cellular material is arranged between the casing and the cassette.

16. A turbofan gas turbine engine as claimed in claim 15 wherein an additional septum layer is arranged between the additional layer of cellular material and the cassette and a second additional layer of cellular material is arranged between the additional septum layer and the cassette.

17. A turbofan gas turbine engine as claimed in claim 1 wherein the first layer of cellular material is weaker than the second layer of cellular material.

18. A turbofan gas turbine engine as claimed in claim 10 wherein the second layer of cellular material is weaker than the third layer of cellular material.

19. A turbofan gas turbine engine as claimed in claim 16 wherein the further layer of cellular material is weaker than the additional layer of cellular material.

20. A turbofan gas turbine engine as claimed in claim 1 wherein the gas turbine engine is a turbofan gas turbine engine and the casing is a fan casing.

21. A turbofan gas turbine engine comprising a fan, a fan casing and a fan blade containment arrangement,
the fan comprising a fan rotor having a plurality of swept fan blades,
the fan casing surrounding the fan rotor and fan blades, the fan casing consisting of a casing having a flange at an upstream end and a flange at a downstream end,
the fan blade containment arrangement surrounding the fan rotor and fan blades, the fan blade containment arrangement being arranged radially between the fan casing and the fan, the fan blade containment arrangement being axially shorter than the fan casing, the fan blade containment arrangement comprising a first layer of cellular material abutting a radially inner surface of the fan casing, a septum layer abutting a radially inner surface of the first layer of cellular material, a second layer of cellular material abutting a radially inner surface of the septum layer, a ductile layer abutting a radially inner surface of the second layer of cellular material and a layer of abradable material abutting a radially inner surface of the ductile layer, the ductile layer being axially shorter than the fan casing, wherein the first layer of cellular material is weaker than the second layer of cellular material, the ductile layer being arranged to contain at least a portion of a detached fan blade without rupturing.

22. A turbofan gas turbine engine as claimed in claim 21 comprising a second septum layer within the second layer of cellular material, a third layer of cellular material within the second septum layer, the ductile layer within the third layer of cellular material and the layer of abradable material within the ductile layer, wherein the second layer of cellular material is weaker than the third layer of cellular material.

23. A turbofan gas turbine engine as claimed in claim 1 wherein the ductile layer is arranged to prevent the at least a portion of the detached fan blade penetrating therethrough and into an adjacent layer of cellular material.

24. A turbofan gas turbine engine as claimed in claim 1 wherein the first layer of cellular material comprises a layer of honeycomb material, the cells in the layer of honeycomb material being arranged at an angle to the fan casing in a direction of impact.

25. A turbofan gas turbine engine as claimed in claim 1 wherein the second layer of cellular material comprises a layer of honeycomb material, the cells in the layer of honeycomb material being arranged at an angle to the fan casing in a direction of impact.

26. A turbofan gas turbine engine as claimed in claim 13 wherein the casing has a hook comprising a radially inwardly extending portion and an axially downstream extending portion and the cassette is positioned downstream of the hook.

27. A turbofan gas turbine engine as claimed in claim 26 wherein the cassette has an axially upstream extending portion arranged to locate on the axially downstream extending portion of the hook.

28. A turbofan gas turbine engine comprising a fan, a fan casing and a fan blade containment arrangement,
the fan comprising a fan rotor having a plurality of fan blades,
the fan casing surrounding fan rotor and the fan blades, the fan casing having a flange at an upstream end and a flange at a downstream end,
the fan blade containment arrangement surrounding the fan rotor and fan blades, the fan blade containment arrangement being axially shorter than the fan casing, a first layer of cellular material abutting a radially inner surface of the fan casing, a septum layer abutting a radially inner surface of the first layer of cellular material, a second layer of cellular material abutting a radially inner surface of the septum layer, a ductile layer abutting a radially inner surface of the second layer of cellular material and a layer of abradable material abutting a radially inner surface of the ductile layer, the ductile layer being axially shorter than the fan casing, the second layer of cellular material being arranged on a radially outer surface of the whole of an axial length of the ductile layer, the layer of abradable material being arranged on the radially inner surface of the whole of the axial length of the ductile layer, the ductile layer being arranged to contain at least a portion of a detached fan blade.

29. A turbofan gas turbine engine comprising a fan, a fan casing and a fan blade containment arrangement,
the fan comprising a fan rotor having a plurality of swept fan blades, the fan blades comprising a composite material,
the fan casing surrounding the fan rotor and fan blades, the fan casing comprising a composite material, the fan casing having a flange at an upstream end and a flange at a downstream end,
the fan blade containment arrangement surrounding the fan rotor and fan blades, the fan blade containment arrangement being arranged radially between the fan casing and the fan, the fan blade containment arrangement being axially shorter than the fan casing, the fan blade containment arrangement comprising a first layer of cellular material abutting a radially inner surface of the fan casing, a septum layer abutting a radially inner surface of the first layer of cellular material, a second layer of cellular material abutting a radially inner surface of the septum layer, a ductile layer abutting a radially inner surface of the second layer of cellular material and a layer of abradable material abutting a radially inner surface of the ductile layer, the ductile layer being axially shorter than the fan casing, the ductile layer being arranged to contain at least a portion of a detached fan blade.

\* \* \* \* \*